(12) United States Patent
Tyler et al.

(10) Patent No.: US 9,467,435 B1
(45) Date of Patent: Oct. 11, 2016

(54) ELECTRONIC MESSAGE THREAT PROTECTION SYSTEM FOR AUTHORIZED USERS

(71) Applicant: MIMECAST NORTH AMERICA, INC., Watertown, MA (US)

(72) Inventors: Simon Tyler, Wiltshire (GB); Steven Malone, Berkshire (GB); Jackie Maylor, Wiltshire (GB); Wayne Van Ry, London (GB); Francisco Ribeiro, London (GB)

(73) Assignee: MIMECAST NORTH AMERICA, INC., Watertown, MA (US)

(*) Notice: Subject to any disclaimer, the term of this patent is extended or adjusted under 35 U.S.C. 154(b) by 0 days.

(21) Appl. No.: 14/855,200

(22) Filed: Sep. 15, 2015

(51) Int. Cl.
*H04L 29/06* (2006.01)
*H04L 12/58* (2006.01)

(52) U.S. Cl.
CPC ............. *H04L 63/08* (2013.01); *H04L 51/046* (2013.01); *H04L 63/0254* (2013.01); *H04L 63/0281* (2013.01); *H04L 63/105* (2013.01); *H04L 63/1441* (2013.01)

(58) Field of Classification Search
CPC . H04L 63/0838; H04L 63/08; H04L 63/168; H04L 63/083; H04L 29/06809; H04L 2463/082; H04L 67/02
USPC .......................................................... 713/153
See application file for complete search history.

(56) References Cited

U.S. PATENT DOCUMENTS

| | | | |
|---|---|---|---|
| 6,253,193 B1* | 6/2001 | Ginter .................... | G06F 21/10 348/E5.006 |
| 6,931,532 B1* | 8/2005 | Davis ................... | G06F 21/6209 380/273 |
| 7,363,490 B2 | 4/2008 | Paulsen et al. | |
| 7,970,843 B2* | 6/2011 | Brown ................. | H04L 12/583 709/203 |
| 8,145,718 B1* | 3/2012 | Kacker ................ | H04L 9/0847 709/206 |
| 8,281,372 B1 | 10/2012 | Vidal | |
| 9,027,115 B2* | 5/2015 | Larson ............. | H04L 29/12066 726/14 |

(Continued)

OTHER PUBLICATIONS

Proofpoint/Gartner, Inc., 'Protecting the way people work:best practices for detecting and mitigating advanced persistent threats', Gartner, Inc., May 4, 2015, entire document, http://www.ciosummits.com/Online_Assets_Proofpoint_Gartner_Best_Practices.pdf.*

(Continued)

*Primary Examiner* — Kari Schmidt
*Assistant Examiner* — Ronald Baum
(74) *Attorney, Agent, or Firm* — ARC IP Law, PC; Joseph J. Mayo

(57) ABSTRACT

An electronic message threat protection system that incorporates user authorization to ensure that only authorized users receive the benefits of the system's protection. The system protects against threats such as phishing attacks or malware embedded in attached files. References to resources in messages, such as links or attachments, are transformed into protected references that may for example insert a level of indirection between the user and the resource. Use of a protected reference triggers a user authorization check; if the user is an authorized user, the system provides access via a security mechanism that mitigates potential threats. Unauthorized users are denied access. A message recipient may deliberately or inadvertently distribute copies of the message or of the protected references; however, the authorization check ensures that recipients of the copies can only access resources via these copies if they are authorized users.

18 Claims, 14 Drawing Sheets

(56) References Cited

U.S. PATENT DOCUMENTS

| | | | | |
|---|---|---|---|---|
| 9,154,498 B2* | 10/2015 | Byrne | | H04L 63/0838 |
| 2002/0095567 A1* | 7/2002 | Royer | | G06F 21/41 |
| | | | | 713/150 |
| 2002/0199096 A1* | 12/2002 | Wenocur | | G06Q 10/107 |
| | | | | 713/153 |
| 2003/0051054 A1* | 3/2003 | Redlich | | G06F 21/6209 |
| | | | | 709/246 |
| 2003/0065941 A1 | 4/2003 | Ballard et al. | | |
| 2003/0227487 A1 | 12/2003 | Hugh | | |
| 2005/0076222 A1* | 4/2005 | Olkin | | H04L 63/0442 |
| | | | | 713/176 |
| 2006/0015945 A1* | 1/2006 | Fields | | G06F 21/606 |
| | | | | 726/27 |
| 2006/0106802 A1* | 5/2006 | Giblin | | G06F 17/30876 |
| 2007/0079379 A1 | 4/2007 | Sprosts et al. | | |
| 2007/0143827 A1* | 6/2007 | Nicodemus | | G06F 21/6218 |
| | | | | 726/2 |
| 2007/0192853 A1 | 8/2007 | Shraim et al. | | |
| 2008/0115227 A1* | 5/2008 | Toutonghi | | G06F 21/10 |
| | | | | 726/29 |
| 2008/0301445 A1* | 12/2008 | Vasic | | G06F 17/30067 |
| | | | | 713/171 |
| 2009/0216841 A1 | 8/2009 | Choi et al. | | |
| 2010/0175136 A1 | 7/2010 | Frumer et al. | | |
| 2011/0145580 A1* | 6/2011 | Auradkar | | H04L 63/0428 |
| | | | | 713/170 |
| 2011/0179362 A1* | 7/2011 | Craddock | | H04L 51/08 |
| | | | | 715/752 |
| 2011/0296179 A1* | 12/2011 | Templin | | G06F 21/606 |
| | | | | 713/168 |
| 2013/0074191 A1* | 3/2013 | Ben-Reuven | | G06F 21/6209 |
| | | | | 726/26 |
| 2014/0229617 A1* | 8/2014 | Cyr | | G06F 11/3495 |
| | | | | 709/224 |
| 2014/0282964 A1 | 9/2014 | Stubblefield | | |
| 2015/0039886 A1* | 2/2015 | Kahol | | G06F 21/60 |
| | | | | 713/165 |
| 2015/0121063 A1* | 4/2015 | Maller | | H04L 63/0435 |
| | | | | 713/153 |
| 2015/0350143 A1 | 12/2015 | Yang et al. | | |

OTHER PUBLICATIONS

Blue Coat Systems Inc., 'Web Application Firewall for Web Environments', Blue Coat Systems Inc., 2015, entire document, https://www.bluecoat.com/documents/download/c8988db3-06c0-4fb5-8bf2-2ec3e934e18e/f86a2dc5-cc4c-4756-b82a-1605470ede21.*

* cited by examiner

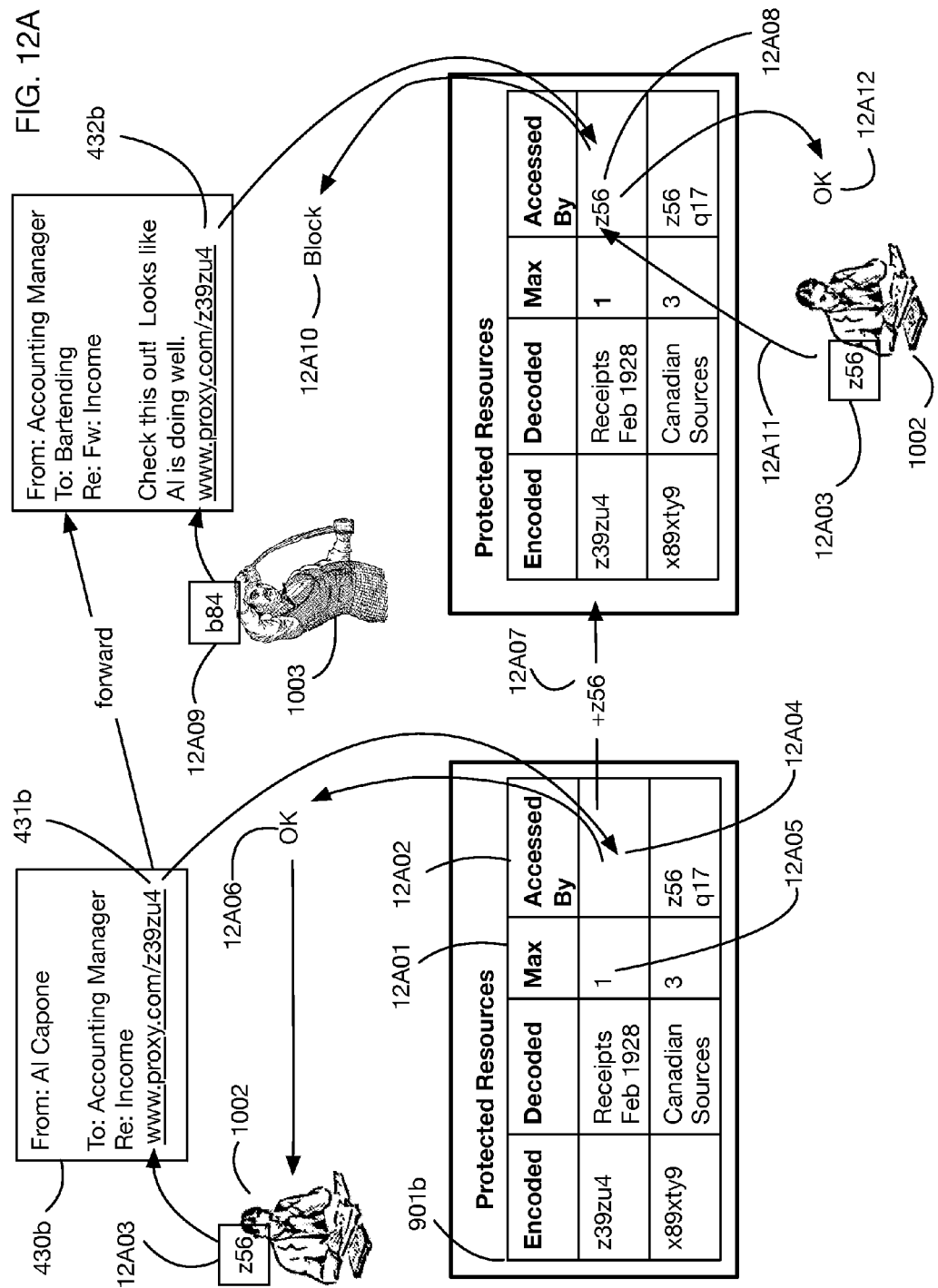

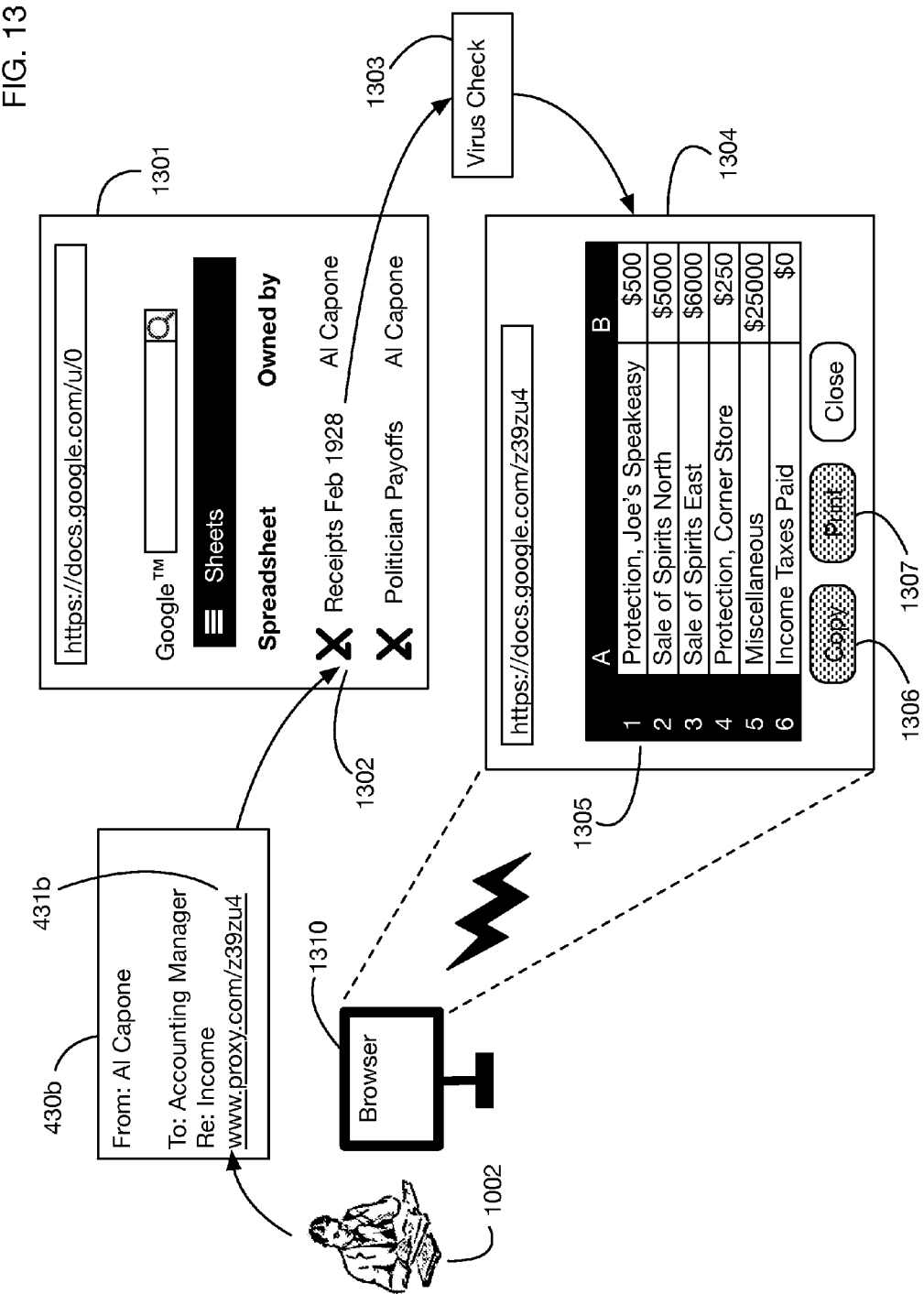

ELECTRONIC MESSAGE THREAT PROTECTION SYSTEM FOR AUTHORIZED USERS

BACKGROUND OF THE INVENTION

1. Field of the Invention

One or more embodiments of the invention are related to the field of data processing and electronic messaging systems. More particularly, but not by way of limitation, one or more embodiments of the invention enable an electronic message threat protection system with user authorization, which transforms references such as links or attachments in messages into a protected form that embeds security checks and user authorization checks.

2. Description of the Related Art

Existing systems that enable communication of electronic messages include email, instant message, text message, calendar, and audio and video messaging systems. Electronic messages may contain security threats such as attachments with viruses, or phishing attacks with links to web sites that attempt to steal sensitive information. Message recipients are often unable or unwilling to protect themselves sufficiently from these threats. Therefore, electronic message security systems have emerged in the art to provide a degree of protection against some threats embedded in messages. For example, systems that automatically scan message attachments for viruses are known in the art.

Threats in web page links, such as phishing attacks, present a more complex challenge. Blocking all links may be impractical. Checking a link prior to sending a message to a recipient provides incomplete protection, since it is possible for a site to become malicious or to be recognized as malicious after the initial check. For improved security there is a need for a system that checks links, and other resources or resource references embedded in electronic messages, at the time the message recipient accesses them. However, this solution presents an additional challenge since message recipients can easily copy and share protected resource references that incorporate security checks. The security checking resources and benefits are therefore made available to anyone. Moreover, security checking resources are consumed on each access to a protected reference; widespread distribution of copies of these protected references can therefore overwhelm security checking system resources such as processor capacity, memory, or network bandwidth. Social media sites and social messaging systems compound this problem because links or other references may be shared instantly with many thousands of users. Ideally the protection offered by a security system should be available only to authorized users of the system. There are no known systems that combine electronic message threat protection with user authorization, in order to limit threat protection to those users that the system intends to protect.

For at least the limitations described above there is a need for a system that protects against threats in electronic messages, and that limits this threat protection to authorized users of the system.

BRIEF SUMMARY OF THE INVENTION

One or more embodiments described in the specification are related to a system that protects against threats from electronic messages, while also incorporating user authorization processes to control access to resources and to the threat protection services. Embodiments of the system convert resources or references to resources such as attachments or links into protected references that provide indirect access to the resources via the system. This level of indirection ensures that users' attempts to access the resources invoke the system's authorization checks and security checks on the resources. One benefit of the system is that copies, including unauthorized copies, of protected resource references are subject to the same authorization and security checks as the protected resource references in the received messages.

One or more embodiments of the system include at least three subsystems: a message transformation subsystem, an authorization subsystem, and a secure resource access subsystem. The message transformation subsystem may for example transform an electronic message into a protected message prior to forwarding it from the sender to the recipient or recipients. This transformation may use a reference rewriting module that replaces resources or references to resources in the original message with protected references that may add authorization and security checks. The authorization subsystem may use various techniques to determine if a user is an authorized user of the security services of the system, and whether the user is permitted to use the protected reference to access the resource. The secure resource access subsystem may use various techniques to provide authorized users with access to protected resources via a security mechanism that mitigates one or more potential threats from the resource. The protected resource reference may be configured to trigger the appropriate authorization checks and security measures automatically when it is accessed, or when a copy of it is accessed. If a user is not an authorized user, access to the resource may be blocked. If the user is an authorized user, access to the resource may be allowed but only via the security mechanism of the secure resource access subsystem.

One or more embodiments may provide authorization and security checks for resource references that include links to web pages. The protected reference for a web page link generated by the message transformation subsystem may for example be a link to a page on a proxy server, where the path is encoded. The proxy server may for example host or communicate with the authorization subsystem and the secure resource access subsystem. When a user uses the protected reference that includes the encoded link, the proxy server may check whether the user is authorized, and if so it may decode the link to obtain the original link and then check the security of the originally referenced web page.

One or more embodiments may provide secure access to a web page by checking the web page for potential threats prior to allowing user access to the web page. One or more embodiments may use various techniques to perform this threat checking. If the check determines that the web page is a known or suspected malicious web page, one or more embodiments may for example block access, warn the user about the potential threat, or both. If the check determines that the web page is likely safe, access may be provided via the decoded link to the web page.

One or more embodiments may check a web page for potential threats using a blacklist, a whitelist, or both. A blacklist may contain identities of web pages that are known or suspected to be malicious. A whitelist may contain identities of web pages that are believed to be secure. One or more embodiments may use any type of identity for web pages or other resources in order to associate threat information or threat assessments with a web page or other resource. For example, without limitation, a web page identity may be a domain name, a partial domain name, an IP address, a certificate, or a digital signature. One or more embodiments may use identities that may be confirmed via an authentication mechanism, such as for example, without limitation, DomainKeys Identified Mail (DKIM), Sender Policy Framework (SPF), or validation via a certificate authority. One or more embodiments may include configuration tools for users or administrators to enter and edit blacklists or whitelists. One or more embodiments may obtain blacklists or whitelists or portions thereof from external sources. Generally, if a web page has an identity that is on the blacklist, an embodiment may block access; conversely if a web page has an identity that is on the whitelist, an embodiment may allow access. For web pages that appear on neither the blacklist or the whitelist, one or more embodiments may have a policy for the appropriate action, which may for example be to allow access, to block access, or to warn the user.

One or more embodiments may use other techniques in addition to or instead of blacklists and whitelists to determine if a web page poses a potential threat. For example, phishing web sites often have URLs that appear to be almost the same as the URL of a known site that the phishing site is imitating. As an example, a phishing attack may direct a user to a website with domain name www.humurouspettricks.com, when the real legitimate website is www.humorouspettricks.com; a recipient may be unlikely to notice the single-letter difference between the two domain names. One or more embodiments may for example block web pages with identities (such as URLs) that are similar to known legitimate web pages.

One or more embodiments may perform user authentication using a database of registered users and their credentials. User credentials may be obtained as part of the access of a protected reference, either implicitly or by explicitly asking the user, and compared to the credentials of registered users. Embodiments may use any form of user credentials, including for example, without limitation, an IP address or IP address range, a password, a PIN, a one-time PIN or one-time password sent to the user, a biometric credential, a security token, a security certification, a response to a challenge question, and credentials from a single sign-on service. One or more embodiments may cache valid credentials of a user, for example in a cookie on the user's local computer, and retrieve these cached credentials for subsequent access attempts by the user.

In one or more embodiments, authorized users of the system may not necessarily be authorized to access all resources. One or more embodiments may include an access control list for one or more resources in the authorization database of the authorization subsystem. The access control list for a resource may specify for example which users or groups of users may access the resource, or what permissions each user has for the resource. In some situations, access to a resource may be limited for example to the sender and recipient or recipients of the message containing the resource or resource reference. In these situations, if a recipient forwards a message with a protected reference to another authorized user of the system, that user would not be able to access the resource if he or she was not a recipient of the original message, unless the recipient also forwards a password or other access mechanism.

One or more embodiments may create log entries describing attempts by unauthorized users to access protected resources. These log entries may assist system users and administrators in identifying potential leaks of information and potential violations of security policies. In one or more embodiments log entries, messages, or alerts warning of access attempts by unauthorized users may be sent automatically to one or more recipients, such as for example system administrators or the original sender of a message.

In one or more embodiments if an unauthorized user of a resource attempts access, the system may give this user the option of requesting access to the resource from the appropriate authority such as the sender, the recipient, or a system administrator.

One or more embodiments may use authorization techniques that do not require obtaining credentials from a user. For example, one or more embodiments may set a maximum number of times a resource can be accessed. The authorization subsystem may track access counts, and block further access once an access count for a resource reaches the maximum. Similarly, one or more embodiments may set a maximum length of time that a resource can be accessed, using for example an expiration date for a protected reference.

One or more embodiments may track an access history for each protected resource reference; the access history may for example be an accessed-by list of distinct users who have accessed the protected resource reference. One or more embodiments may limit the maximum number of users on the accessed-by list for a resource reference. When a new user attempts to access a protected resource reference, access may be allowed only if the size of the accessed-by list for the resource is below the maximum users count for that resource. When a user who is already on the accessed-by list for a resource attempts a subsequent access, access may be allowed. This scheme is illustrative; one or more embodiments may use any desired access control mechanism to limit or control access to protected resource references.

In one or more embodiments a resource may be an attached file. The secure resource access subsystem may be configured to open the file in a sandbox environment to mitigate potential threats from the file. A protected reference to the file may for example contain an address of a proxy server that manages the sandbox environment, and an encoded reference to the sandboxed file. After a user passes an authorization check, the proxy server may decode the reference and open the sandboxed file in the sandbox environment. In one or more embodiments a sandbox environment may be for example a cloud-based file system with managed cloud applications coupled to the file system; files may be opened using the managed cloud applications to provide access in a secure environment.

BRIEF DESCRIPTION OF THE DRAWINGS

The above and other aspects, features and advantages of the invention will be more apparent from the following more particular description thereof, presented in conjunction with the following drawings wherein:

FIG. 12A illustrates a variation of the embodiment of FIG. 12 that limits the maximum number of users that may access a resource.

FIG. 13 illustrates an embodiment of the invention that provides secure access to a resource by opening it in a managed cloud application rather than on a user's local computer.

DETAILED DESCRIPTION OF THE INVENTION

A system for annotation of electronic message threat protection for authorized users will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
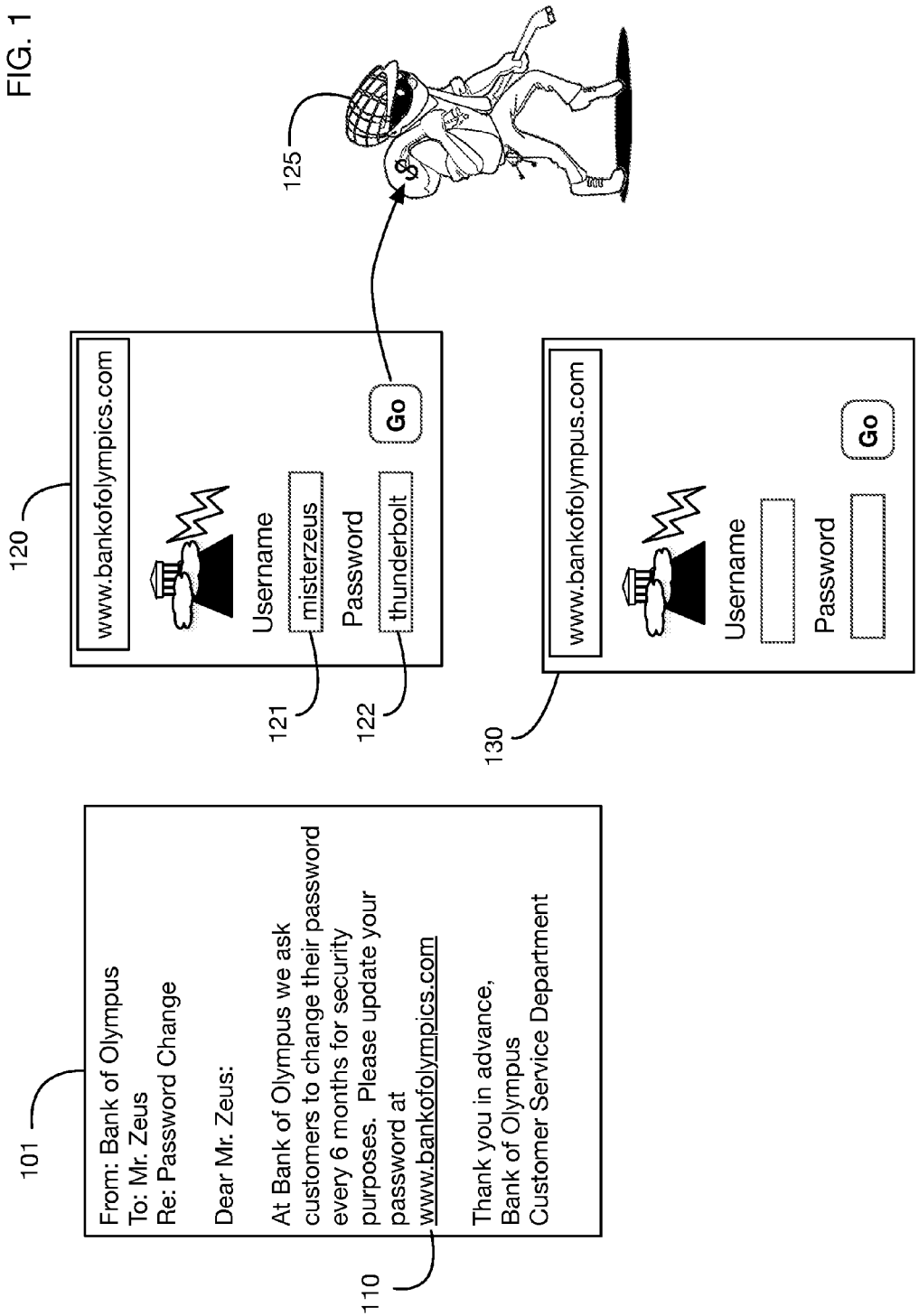
FIG. 1 illustrates an example of a problem addressed by one or more embodiments of the invention: an email contains a link that appears to refer to a legitimate web page, but is in fact a phishing attack designed to steal a user's credentials.

FIG. 1 illustrates an example of a problem that one or more embodiments of the invention address. This problem is that electronic messages may contain resources or references to resources that contain threats. Resources may present many different kinds of threats, such as for example viruses, worms, Trojan horses, or malware. FIG. 1 illustrates a particular example of a phishing attack threat embedded in a link reference to a web page. Electronic message 101, an email message, contains a link 110, and it asks the receiver to click on the link. As is typical of spear-phishing attacks, the message 101 is addressed to a specific receiver and it includes enough plausible information to make the receiver believe that the message is legitimate. The link 110 actually points to a malicious web site 120, which is designed to look very similar to the legitimate web site 130 that the recipient believes he is viewing. The URLs of the malicious site 120 and the legitimate site 130 are only subtly different, reinforcing the illusion. If the recipient enters his name 121 and password 122 into the malicious web page, they are sent to a thief 125 who can then use these credentials as desired.

This example illustrates a particular type of threat addressed by one or more embodiments of the invention. One or more embodiments may address any type of threat embedded in any type of electronic message. Threats may be incorporated for example, without limitation, into email messages, instant messages, text messages, personal messages, chat messages, Twitter™ messages, Instagrams™, voicemails, video messages; and postings onto social media sites, blogs, forums, newsgroups, wikis, or databases. Threats may include for example, without limitation, viruses, worms, spam, phishing attacks, spear-phishing attacks, social engineering attacks, denial of service attacks, advertisements, malware, adware, and ransomware. Threats may be embedded into any types of resources included in or referred to in an electronic message, including for example, without limitation, attachments, files, links, media, forms, workflow automation mechanisms, or embedded or linked code in JavaScript or any other language.

Figure 2:
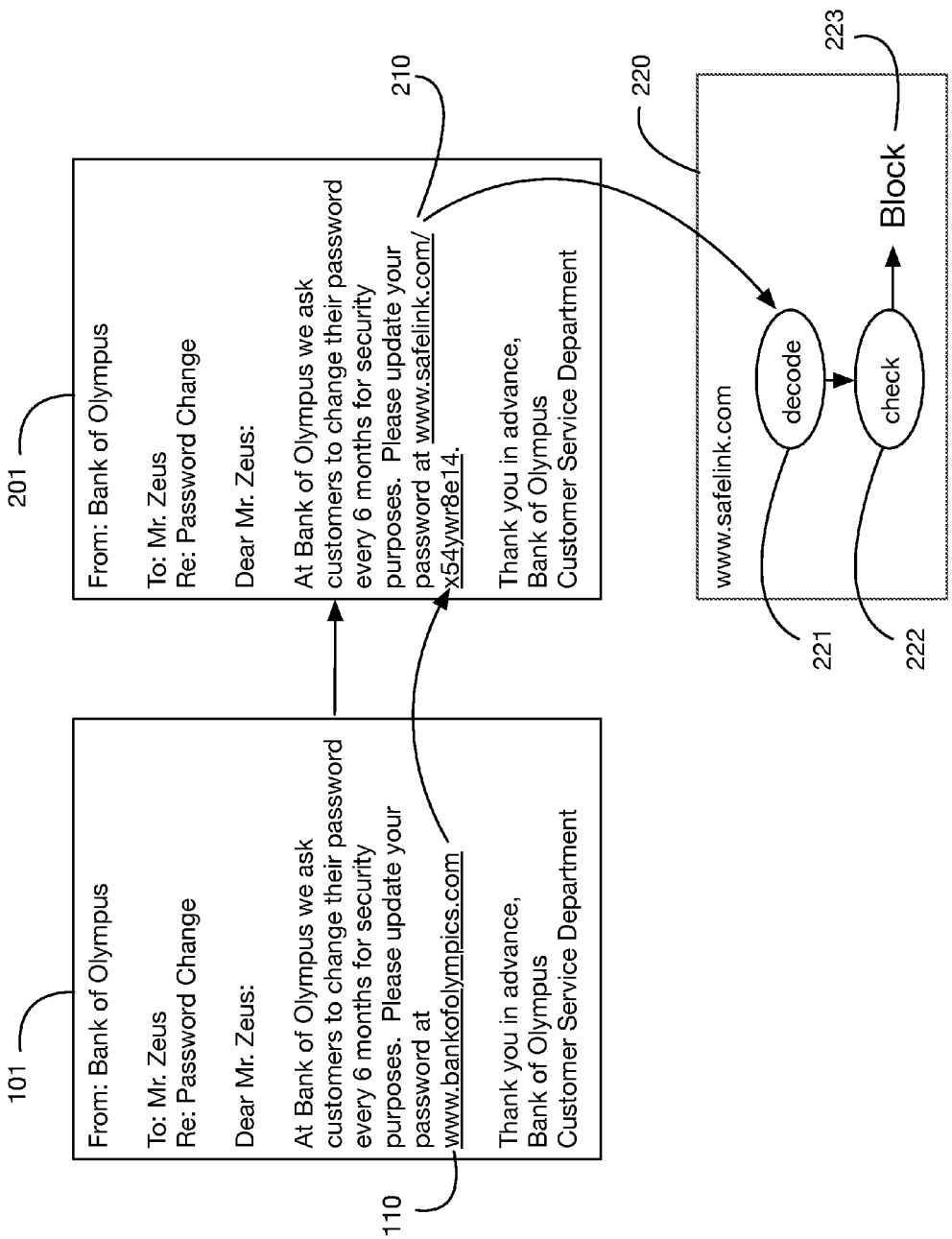
FIG. 2 illustrates a potential solution to the problem shown in FIG. 1 that is used in one or more embodiments of the invention, where a link is rewritten into an encoded form with threat checking added when a user clicks the encoded link.

FIG. 2 illustrates an example of a solution to the problem shown in FIG. 1 that is provided by one or more embodiments. Instead of sending email message 101 with malicious link 110 directly to the recipient, an email security layer transforms the message 101 into message 201, which transforms the link 110 to a protected, encoded link 210. The encoded link 210 does not connect directly to the web page 120. Instead it provides a level of indirection that incorporates a security check before opening the target web page. For example, the encoded link 210 points to a proxy server 220 (with URL "www.safelink.com"), and the encoded link 210 has a path ("x54ywr8e14") that is used internally by the proxy server to identify the original web page referred to by link 110. The proxy server 220 executes a decode step 221 to recover the original link, and it performs a check 222 on the web page before opening it and sending its contents to the user. In this example the check 222 shows that the web page is malicious, so the proxy server blocks access 223 rather than allowing the user to see the malicious web page. One or more embodiments may use any desired methods to encode and decode links or other resource references. Any form of encoding may be used as long is enough information is available in the encoded link or encoded resource reference to recover the original link or reference. For example, one or more embodiments may use an invertible function to convert a link to an encoded form, and apply the inverse function to recover the original link. One or more embodiments may store an original link in a memory or database accessible to the proxy server, and generate a reference to the saved link address as the encoded link. One or more embodiments may for example keep a copy of the original message with the original resource references, and generate an encoded resource reference as a reference to the original message along with for example an offset identifying the location of the original reference in the original message.

Figure 3:
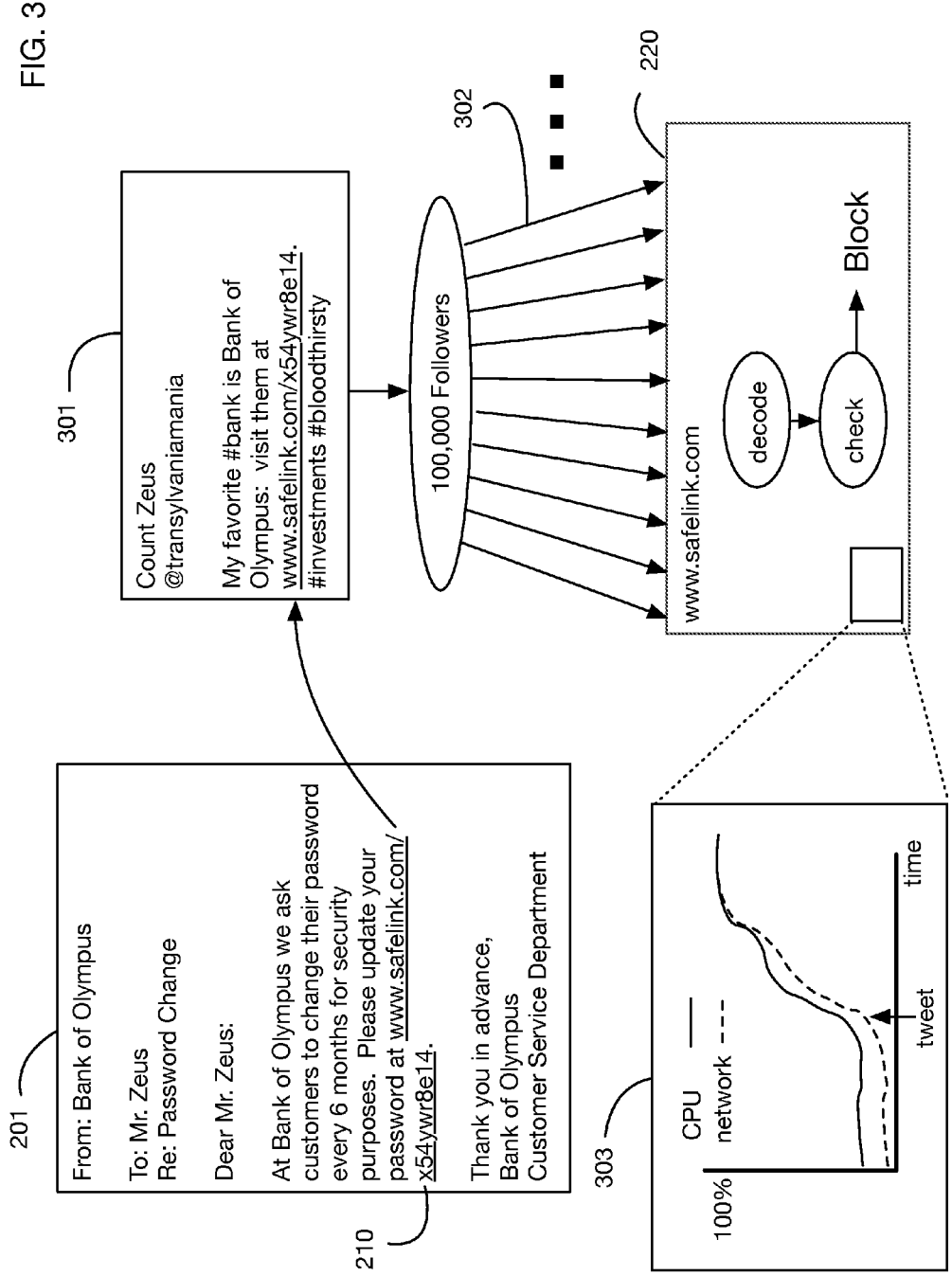
FIG. 3 illustrates a potential problem of the solution shown in FIG. 2, where an encoded link may be shared with a large number of people, many of whom may not have purchased threat protection, potentially overloading the threat protection system resources.

While the solution illustrated in FIG. 2 addresses the original threat of FIG. 1, it may create an additional problem, as illustrated for example in FIG. 3. Users can often copy resource references from electronic messages and redistribute or post them elsewhere. For example, users may copy and paste links, or forward messages to other users. If a resource reference is rewritten in a protected form, as illustrated in FIG. 2, the protected reference will be copied and distributed instead of the original reference. The protection provided by the system will then be available to any user of the copied protected references. This uncontrolled copying may create several problems, including an economic problem that the services provided by the system are available for free to users who did not pay for the services. In addition, FIG. 3 illustrates that widespread copying may create extreme system utilization problems. In FIG. 3, transformed message 201 has a protected link 210. The recipient of the message copies this link and widely distributes it, here in a tweet message 301. In this illustrative example, the user posting tweet 301 has a very large number of followers, each of whom receives a copy of the protected link 210. If many of these users attempt to access the protected link simultaneously, a very large number of requests 302 will be sent to proxy server 220. These requests may cause the resource utilization 303 of the proxy server to spike, potentially to the point that the server becomes unresponsive and unusable.

Uncontrolled copying of protected references may create additional problems. For example, in one or more embodiments protected references such as protected links may include information about the sender or recipient of the electronic message. This information may then be leaked along with the protected reference. Moreover, these leaks may be unintentional since the message recipient may not realize that this sensitive information is embedded in the protected reference. As an example, one or more embodiments of the system may provide an interface that shows personalized messages to a recipient when the recipient clicks on a protected link; these messages may for instance include sensitive information about the recipient or about the recipient's organization that should not be shared with others.

Figure 4:
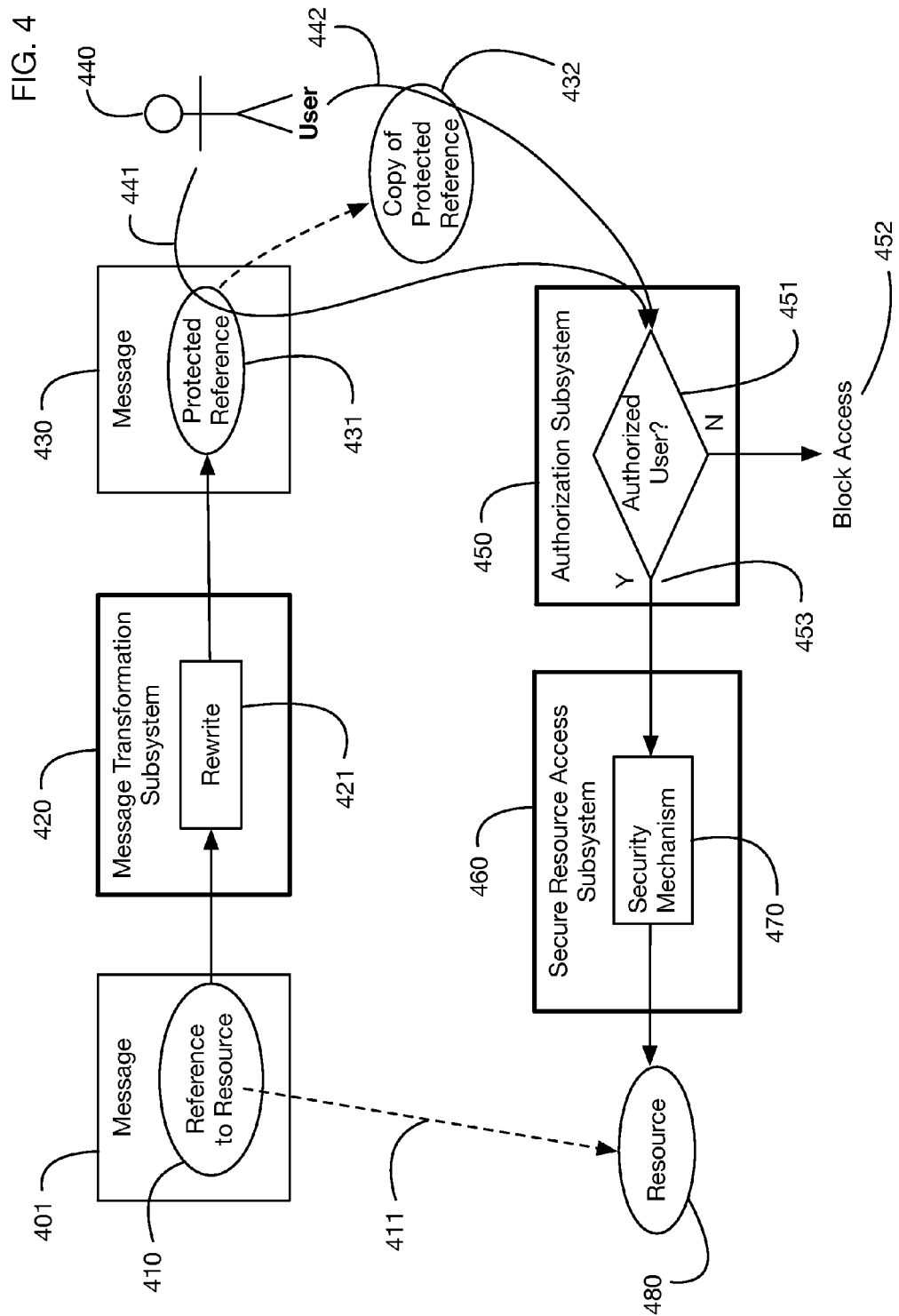
FIG. 4 illustrates an architectural block diagram of an embodiment that addresses issues like those shown in FIG. 3 by providing threat protection only to authorized users.

FIG. 4 illustrates an architectural block diagram of one or more embodiments of the invention that address the types of problems illustrated in FIG. 3. These embodiments add a user authorization check to the system to ensure that only authorized users receive the benefit of the threat protection transformations and checks. The system receives as input an electronic message 401 that contains a reference 410 to a resource. The reference 410 conceptually provides a link or a pointer 411 to a resource 480. In one or more embodiments the resource itself may be included directly in a message, rather than indirectly via a reference; in this case the reference 410 and the resource 480 may be considered identical. This link or pointer may have any form, such as for example, without limitation, a name, a directory name, an attachment, an address, a memory location, a key, an index, a virtual address, a URL, a URI, or a URN. The message may also have one or more senders and one or more recipients, as well as any other content or message parts. As discussed above, one or more embodiments may receive electronic messages of any type, which may include resource references of any type. The single reference 410 in message 401 is for illustration only; one or more embodiments may accept and process messages with any number of resource references. An electronic message with multiple resource references may have resources or references of multiple types; for example, a message may include one or more embedded links and one or more attached files. The system illustrated in FIG. 4 transforms the original message 401 to a transformed message 430 via Message Transformation Subsystem 420. Message Transformation Subsystem 420 includes a resource reference rewriting module 421 that transforms an original reference 410 to a protected reference 431. The transformed message 430 is then delivered to one or more message recipients.

One or more embodiments may execute Message Transformation Subsystem 420 on any computer or set of computers. For example, without limitation, a Message Transformation Subsystem or modules thereof may be embedded in an email client, in an email server, in an email gateway, or in any computer or computers attached to or reachable from any of these. Any system or systems in a communication path between a sender and a recipient may execute all or part of the functions of a Message Transformation Subsystem.

Protected reference 431 in message 430 may be copied in some situations to form a copy of the protected reference 432. While FIG. 4 shows only a single copy, in one or more embodiments any number of copies of a protected reference may be generated. Copies may be generated in many ways; for example, without limitation, a user may copy and paste a reference or a portion of a message, forward a message, forward a reference as a text message or as part of a text message, post a reference on a social media site, enter a reference into a database accessible by other users, post a reference in a wiki or a blog, send a Twitter® message including the reference, encode a reference in a QR code and distribute the QR code, reply to a message, print a message, or take a screenshot of a message. Multiple copies of a message may be sent to a distribution list or mailing list, generating multiple copies of a reference. A user 440 may attempt to access the resource via protected reference 431 or via a copy 432. User 440 may or may not be the recipient of the message 430. Access 441 of the protected reference 431, or access 442 of the copy of the reference 432 each cause the system to execute various authorization and security procedures before providing user 440 with access to the resource 480. In the embodiment illustrated in FIG. 4, the system includes Authorization Subsystem 450 that performs check 451 to determine if user 440 is an authorized user. This check prevents the type of problem illustrated in FIG. 3, where multiple unauthorized users can use copies of protected references to access the resource. If authorization check 451 indicates that the user is not an authorized user, the system blocks access 452. If the user is an authorized user, access is allowed 453, and control passes to the Secure Resource Access Subsystem 460. This subsystem of the embodiment of the system provides access to the resource 480 via a Security Mechanism 470. The specific security and threat protection services provided by the Security Mechanism 470 depend on the type of resource and on the types of threats anticipated and thwarted. For example, without limitation, Security Mechanism 470 may perform malware detection, identity confirmation to prevent phishing attacks, modification of a resource to eliminate potential threats, behavior monitoring to look for suspicious behavior, limiting of permissions, or execution of code in a sandbox environment. One or more embodiments may employ any type of Security Mechanism that allows access to a resource while mitigating one or more threats. One or more embodiments may employ multiple security mechanisms to address multiple types of threats, or to provide additional security.

In one or more embodiments, the Authorization Subsystem 450 and the Secure Resource Access Subsystem 460 may execute on the same computer or same group of computers. In one or more embodiments these subsystems may be separate and they may communicate over one or more network connections. Modules of these subsystems may execute for example on a client computer, such as the computer of a message recipient. They may execute for example as part of an email server that serves email messages to clients. They may execute for example on a server on which the resource is located. They may execute for example on a proxy server that is accessed by an email client, and which then communicates with a server that contains the resource. Any configuration of the functions of these subsystems on any computer or computers accessible to a user or to a resource, or on any path between a user and a resource, is in keeping with the spirit of the invention.

Figure 5:
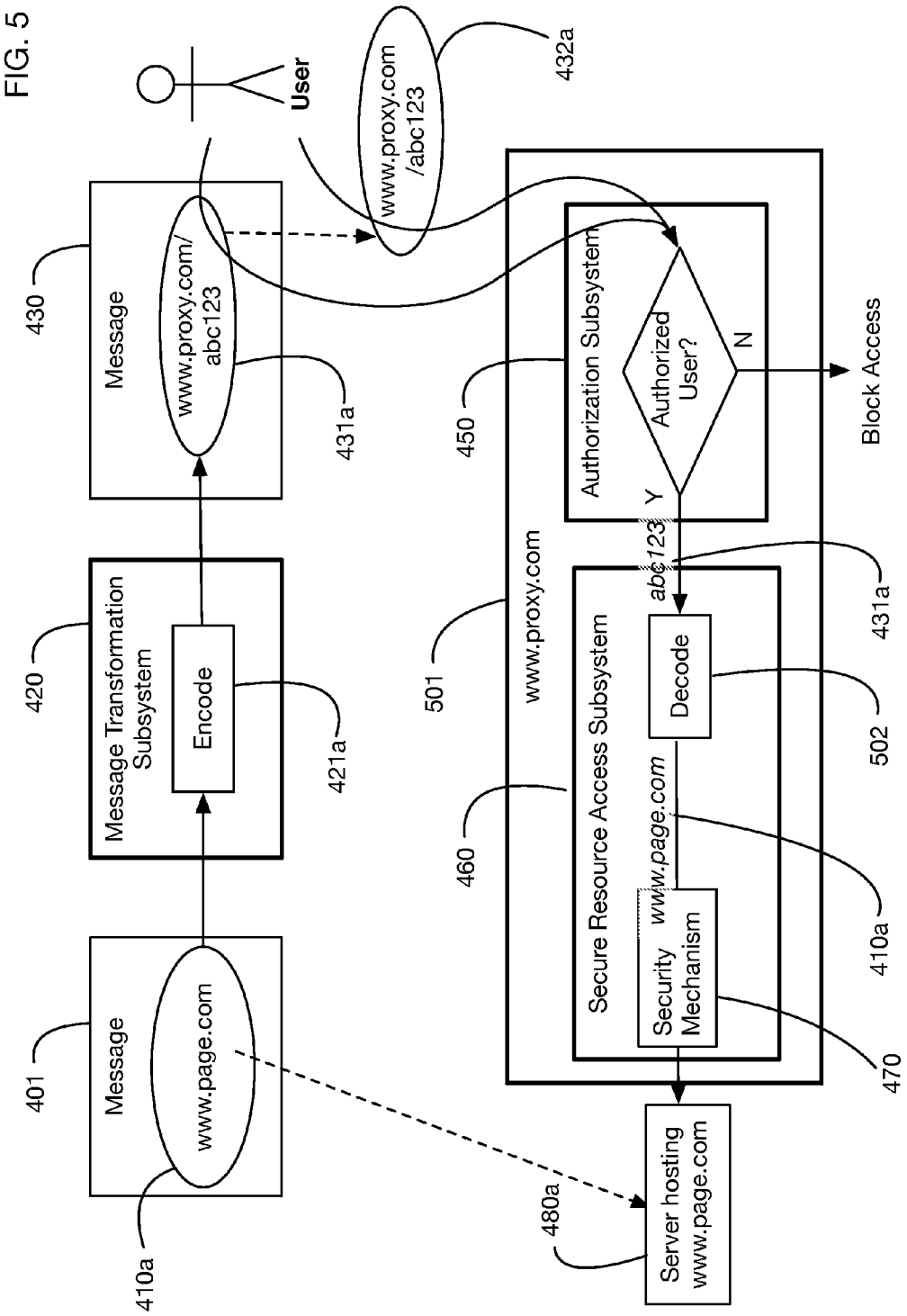
FIG. 5 illustrates an architectural block diagram of an embodiment that provides threat protection against links to malicious web pages embedded in electronic messages.

FIG. 5 illustrates an embodiment of the system that provides protection to authorized users for resource references that include links to web pages. This embodiment follows the general architecture illustrated in FIG. 4, with specific components to handle links. In this embodiment, message 401 contains a link 410a to a web page. One or more embodiments may accept messages with any types of links to any types of resource. Links may be for example, without limitation, any uniform resource locator (URL), uniform resource identifier (URI), or uniform resource name (URN) that reference any type of resource, including but not limited to web pages. URIs for example may use any URI scheme, including for example, without limitation, file, http, https, ftp, rtsp, telnet, imap, dns, smtp, mailto, news, or sms. Any method of referring to resources may be used by one or more embodiments. One or more embodiments may accept and rewrite messages with resources included directly in a message, rather than indirectly via a link or reference.

Message Transformation Subsystem 420 includes an Encode module 421a that rewrites the link 410a into an encoded form 431a. In the illustrative embodiment shown in FIG. 5, this encoded link 431a provides an indirect and encoded link to the resource through proxy server 501. Access by a user to the encoded link 431a, or to a copy thereof 432a, accesses the proxy server 501; the proxy server uses the path name ("abc123") after the proxy server's hostname ("www.proxy.com") to determine which resource is referred to. This scheme is illustrative; one or more embodiments may encode links or other resources or resource references in any desired manner. As discussed for FIG. 4, the proxy server first applies a check for authorized users via the Authorization Subsystem 450. If the user is authorized, the encoded link 431a is decoded by Decode module 502, yielding the original link 410a to the web page. Any method may be used to encode and decode links. For example, one or more embodiments may use a bijective cryptographic function using a key shared between the Message Transformation Subsystem and the Secure Resource Access System. As another example, in one or more embodiments the Message Transformation Subsystem may generate random encoded links and share a table associating encoded and decoded links with the Secure Resource Access Subsystem.

After user authorization, the Secure Resource Access Subsystem 460 provides access to the web page 480a via Secure Mechanism 470 in order to detect potential threats posed by the web page. FIG. 5 illustrates the Authorization Subsystem 450 and the Secure Resource Access Subsystem 460 executing on the same proxy server 501. This is an illustrative configuration; one or more embodiments may distribute these subsystems or modules of these subsystems across servers or other computers in any desired manner.

Figure 6:
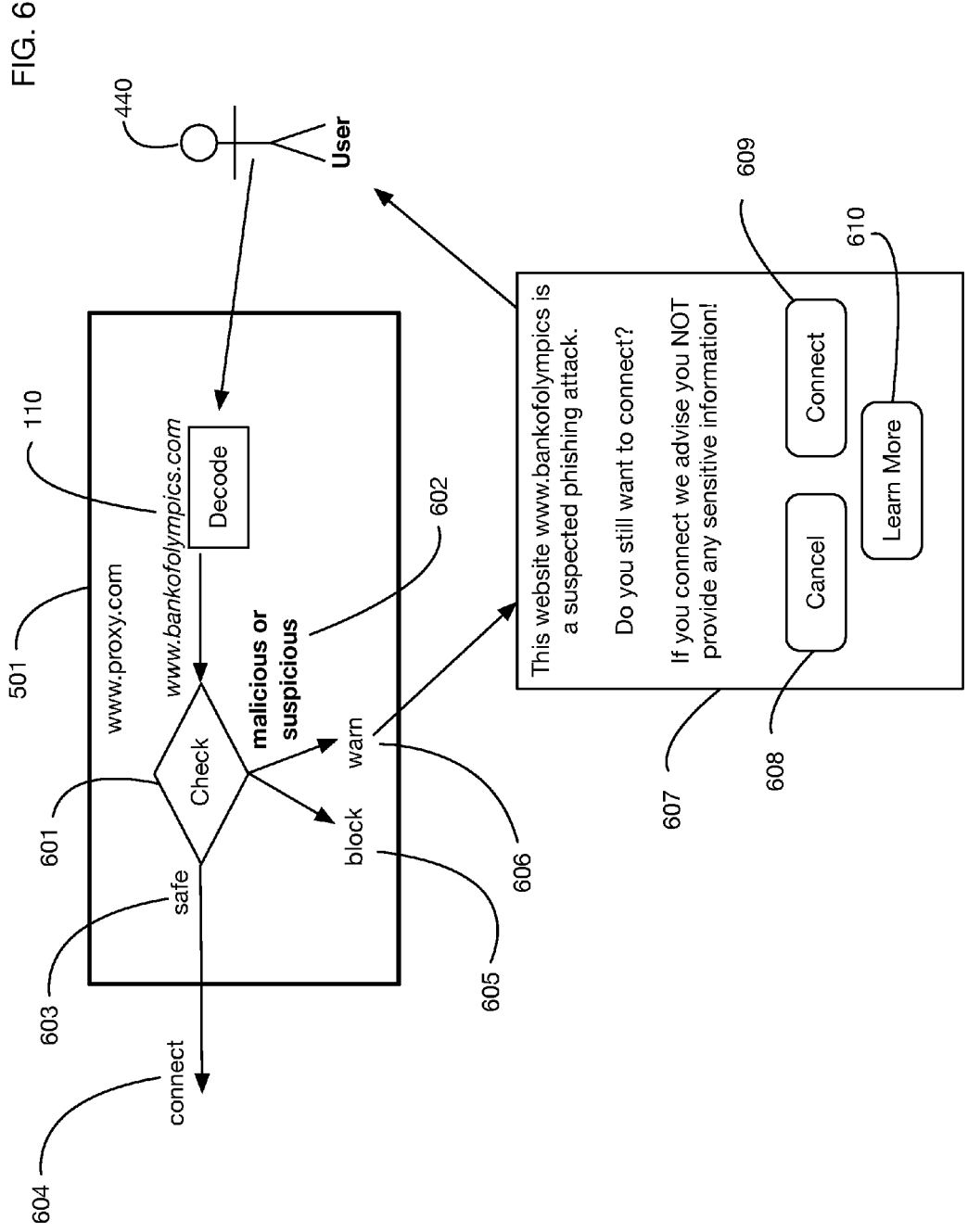
FIG. 6 illustrates possible outcomes of checking a link in an embodiment of the invention, which include connecting, blocking, or warning the user.

One or more embodiments may use various techniques to provide secure access to a link or other resource via a Security Mechanism. FIG. 6 illustrates an embodiment of the system that screens a web page first for possible threats, and then connects if the web page is deemed safe. Proxy server 501 receives a decoded link 110 from the Decode module. It then performs a safety Check 601 on the web page. This check may use any desired method to determine whether the web page presents known or suspected threats of any kind Below we discuss a check method that uses whitelists and blacklists. Other examples of potential check methods that may be used by one or more embodiments include, without limitation, checking for a valid certificate from a recognized certificate authority, verifying the identity of the sender of a message using for example DomainKeys Identified Mail (DKIM) or Sender Policy Framework (SPF), checking whether the name of a web page or domain is suspiciously similar to that of a known legitimate site, checking the length of time a web page or domain has been registered (under the presumption for example that many phishing sites for instance may be recent or short-lived), checking the IP address associated with a domain for suspicious geographical locations, and using a recommender system to determine a web page's safety reputation.

In the embodiment shown in FIG. 6, Check 601 determines that the link 110 is either safe 603 or malicious or suspicious 602. If the link is deemed safe, the system proceeds to connect 604 to the web page. If the link is deemed malicious or suspicious, one or more embodiments may either block access 605, or warn the user 606. An illustrative warning 607 is presented to the user 440 who requested access to the link. This warning may for example explain to the user why the link is or may be dangerous. It may also provide user education on potential threats and how to avoid them. In this illustrative example the warning presents the user with three options: Cancel 608, which blocks access; Connect 609, which ignores the warning and connects; and Learn More 610, which may present more detailed information about the threat or about threats in general. One or more embodiments may always block 605 rather than warning a user. One or more embodiments may always warn 606 and never block 605. One or more embodiments may block certain links and warn the user about other links. In one or more embodiments a user warning may for example ask the user one or more questions about the link or about the message in which the link was included; the system may then determine whether to allow access to the link based on the user's response to the questions.

Figure 7:
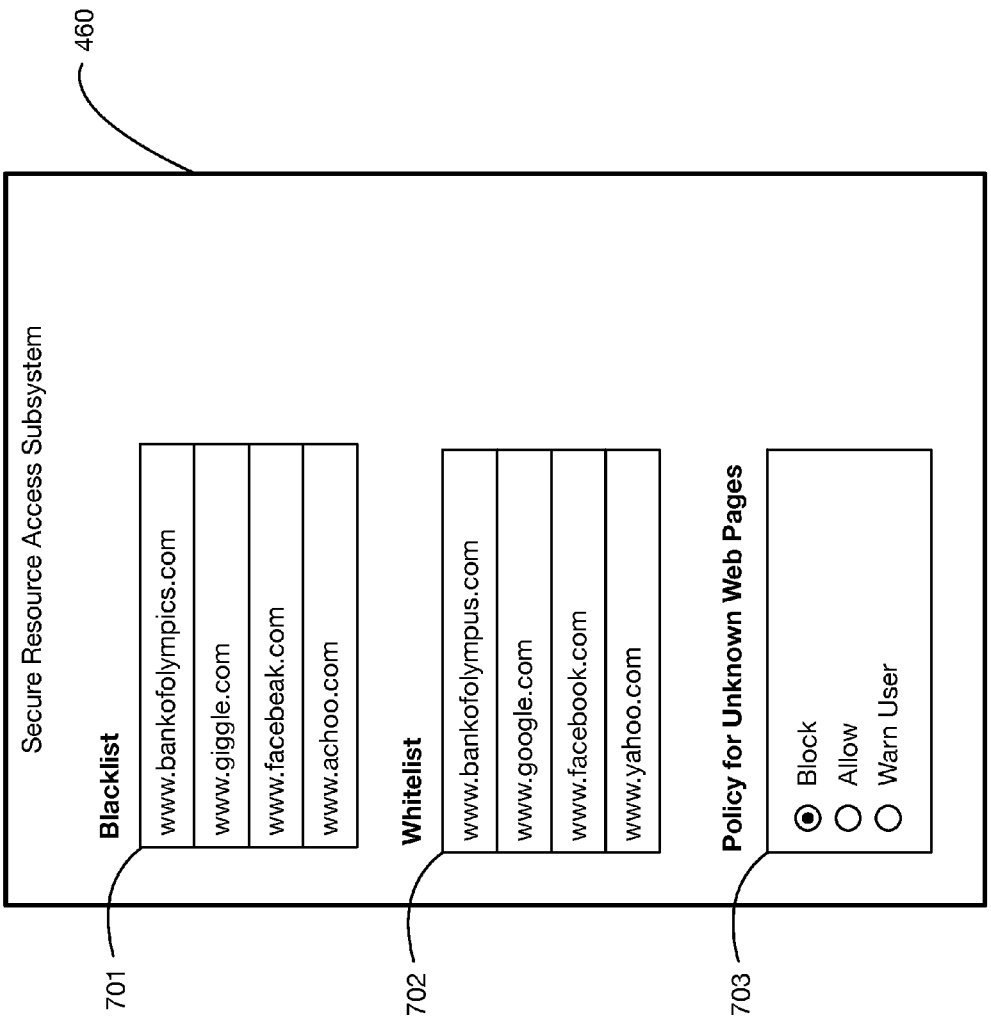
FIG. 7 illustrates an embodiment of a Secure Resource Access Subsystem that has blacklist and whitelist tables, and a policy for web pages in neither list.

FIG. 7 illustrates an embodiment of the system that uses a blacklist and a whitelist to determine whether to allow access to a link. The Secure Resource Access Subsystem 460 contains a Blacklist 701 of domain names that are known or suspected to be malicious, and a Whitelist 702 of domain names that are known or presumed to be safe. An illustrative checking method is to allow access to all links with domains in the Whitelist, and block access to all links with domains in the Blacklist. One or more embodiments may have only one of a Whitelist or a Blacklist. One or more embodiments may use any form of identity for a web page instead of or in addition to a domain name. A web page identity may include for example, without limitation, a domain name for the associated web site, a complete URLs for the web page, an IP address for the web site, or information associated with or derived from a certificate associated with the web site. The embodiment shown in FIG. 7 also has a Policy for Unknown Web Pages 703 that determines the action for a link that appears in neither the Whitelist 702 or the Blacklist 701; options shown are to Block these links, to Allow these links, or to Warn User about these links. One or more embodiments may apply other policies or have other configurable policy options for unknown web pages that appear in neither a Blacklist nor a Whitelist.

One or more embodiments may calculate a suspicion score for a link, and use this suspicion score to determine the action when a user attempts to access the link. For example, links with high suspicion scores may be blocked, those with low suspicion scores may be allowed, and those with intermediate suspicion scores may trigger a user warning. Embodiments may use any desired methodology to calculate a suspicion score. For example, an illustrative suspicion score may be based on how closely the name of a domain from a link matches the domain name of a known legitimate website (while not matching it identically). An example name proximity score is the minimum number of letters that must be added to, deleted from, or modified in one name to obtain another name. An example suspicion score is then for example the inverse of the proximity score (possibly with scaling or offset constants). We take as an illustration the suspicion score: suspicion=10−name proximity. Using the links in FIG. 7 as an illustration, the name proximity score between www.bankofolympics.com and www.bankofolympus.com is 2, since the former can be derived from the latter by replacing "u" with "i" and adding "c". Presuming that www.bankofolympus.com is a known legitimate site, the suspicion score for www.bankofolympics.com is therefore 8. Another illustrative link, www.bankofoliphant.com, has a name proximity score of 6 and a suspicion score of 4; therefore it would be considered less suspicious than www.bankofolympics.com. These calculations and score definitions are illustrative; one or more embodiments may employ any desired methodology to rate or classify links or resources or resource references in order to determine actions when a user attempts to access the link or resource.

Figure 8:
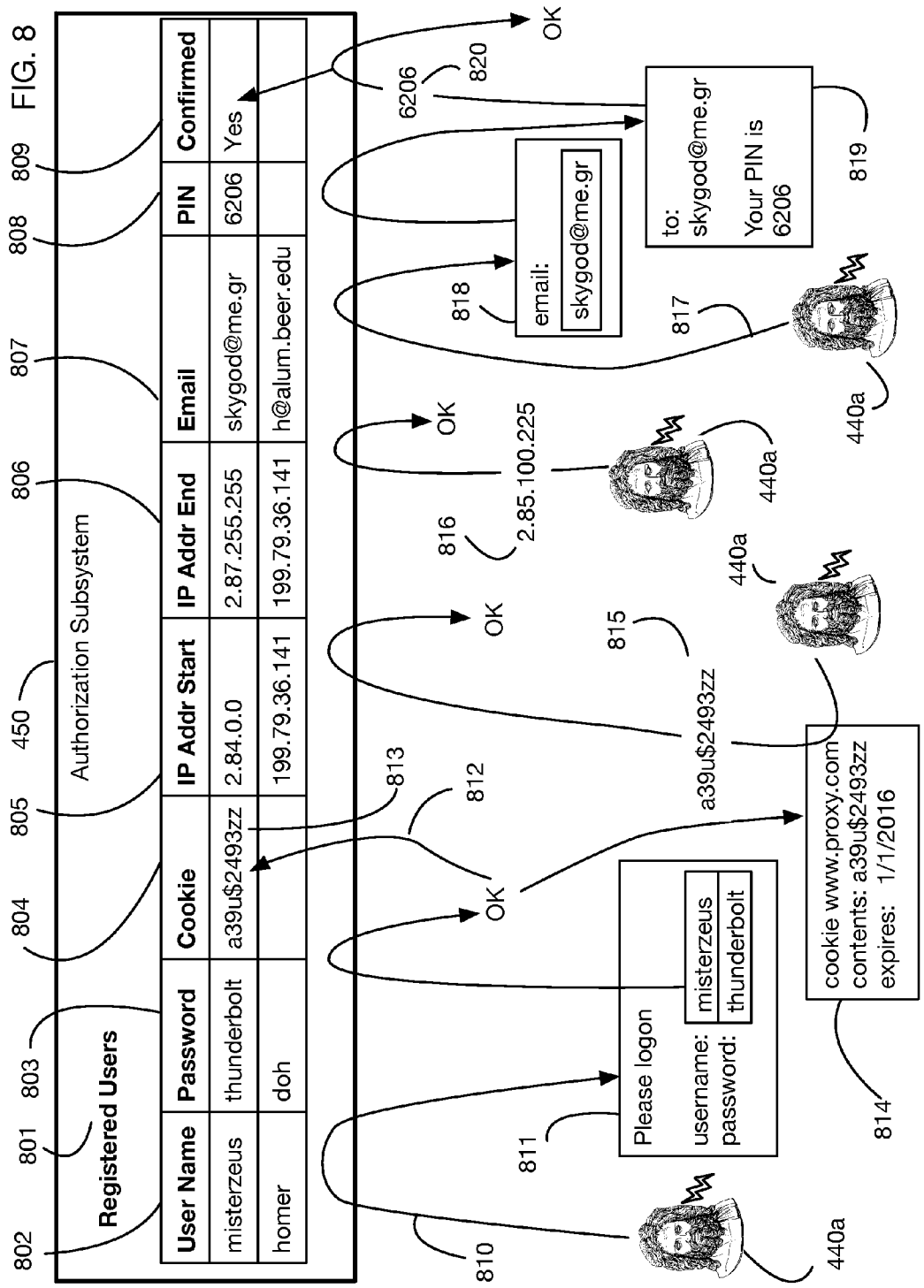
FIG. 8 illustrates an embodiment of an Authorization Subsystem that may obtain one or more types of user credentials to authenticate a user.

Turning now to the Authorization Subsystem, one or more embodiments may determine if a user is an authorized user by requesting credentials from the user and validating these credentials. FIG. 8 illustrates an embodiment in which the Authorization Subsystem 450 includes a table 801 of registered users and their credentials. This table may for example be created by an administrator. One or more embodiments may provide tools for administrators or other users to create or edit user registration entries and credentials, including for example tools to revoke user authorizations. The table 801 may for example be stored in a database or in any other format. One or more embodiments may use any type or types of user credentials. The Registered Users table 801 illustrates some possible credentials that may be used in one or more embodiments. The table has a User Name column 802 and a password column 803. One or more embodiments may use any type of password or PIN and may store these in any unencrypted, encrypted, or hashed form. One or more embodiments may use salted hashing. User 440a attempts access 810 to a protected resource, and the Authorization Subsystem responds with a logon prompt 811 requesting the user name and password; the password is checked against the table 801 and access is permitted. In this illustrative embodiment, after a successful logon credentials are cached in a cookie 814 stored on the user's local computer, and the value 813 of this cookie is added 812 to the table 801 in column 804. A subsequent access attempt by user 440a retrieves and transmits this cookie value 815 to the Authorization Subsystem; the Authorization Subsystem can check the cookie value against the stored value 813 and authorize the user without re-requesting a password. This implementation of stored and cached credentials using a cookie is illustrative; one or more embodiments may use any desired method to cache credentials after an initial validation. One or more embodiments may cache credentials in any memory accessible to a user or to a user's computer.

FIG. 8 illustrates another possible user authorization technique using the user's IP address. The Registered Users table 801 includes an IP address range for each user, stored in columns 805 and 806. When user 440a attempts access, the user's IP address 816 is automatically provided to the system, and the system can check it against the expected IP address range for the user. IP address checks may be particularly useful for example to ensure that employees only access resources from authorized computers with known IP addresses. One or more embodiments may use IP checking as the only or the primary authentication mechanism. One or more embodiments may require additional authentication information in addition to the IP address of the user. One or more embodiments may combine IP address checking with passwords, cookies, or any other scheme for checking user credentials. For example, one or more embodiments may check a user's IP address first, and then use a logon prompt for a password if the initial IP address check fails. One or more embodiments may use any type of user credentials, including for example, without limitation, passwords, PINs, biometric credentials, security certificates, access requests that result in a one-time PIN being sent to a user's registered email or texted to a user's registered mobile device, responses to challenge questions, single sign-on credentials, or security tokens such as USB keys or smart cards. One or more embodiments may use multi-factor authentication combining credentials in any desired manner.

FIG. 8 illustrates another possible user authorization technique that confirms a user's identity by sending a one-time PIN to the user's email address, which may be time limited for example. User 440a attempts access 817 to a protected resource reference, and the system responds with a registration prompt 818 asking the user to provide his or her email address. This causes a one-time PIN to be sent to that email address in message 819, or sent via SMS or in any other manner. The system may first verify that the email address is a valid email for an authorized user of the system. The PIN is stored in column 808 of the Registered User's table 801. In one or more embodiments the stored PIN may be encrypted or hashed. The user provides the PIN 820 to the system, which then indicates that the authentication and user registration is complete in the Confirmed column 809. In one or more embodiments the PIN-based registration may be valid for a limited period of time, and it may for example need to be repeated with a new PIN after an initial registration and authentication has expired.

Figure 9:
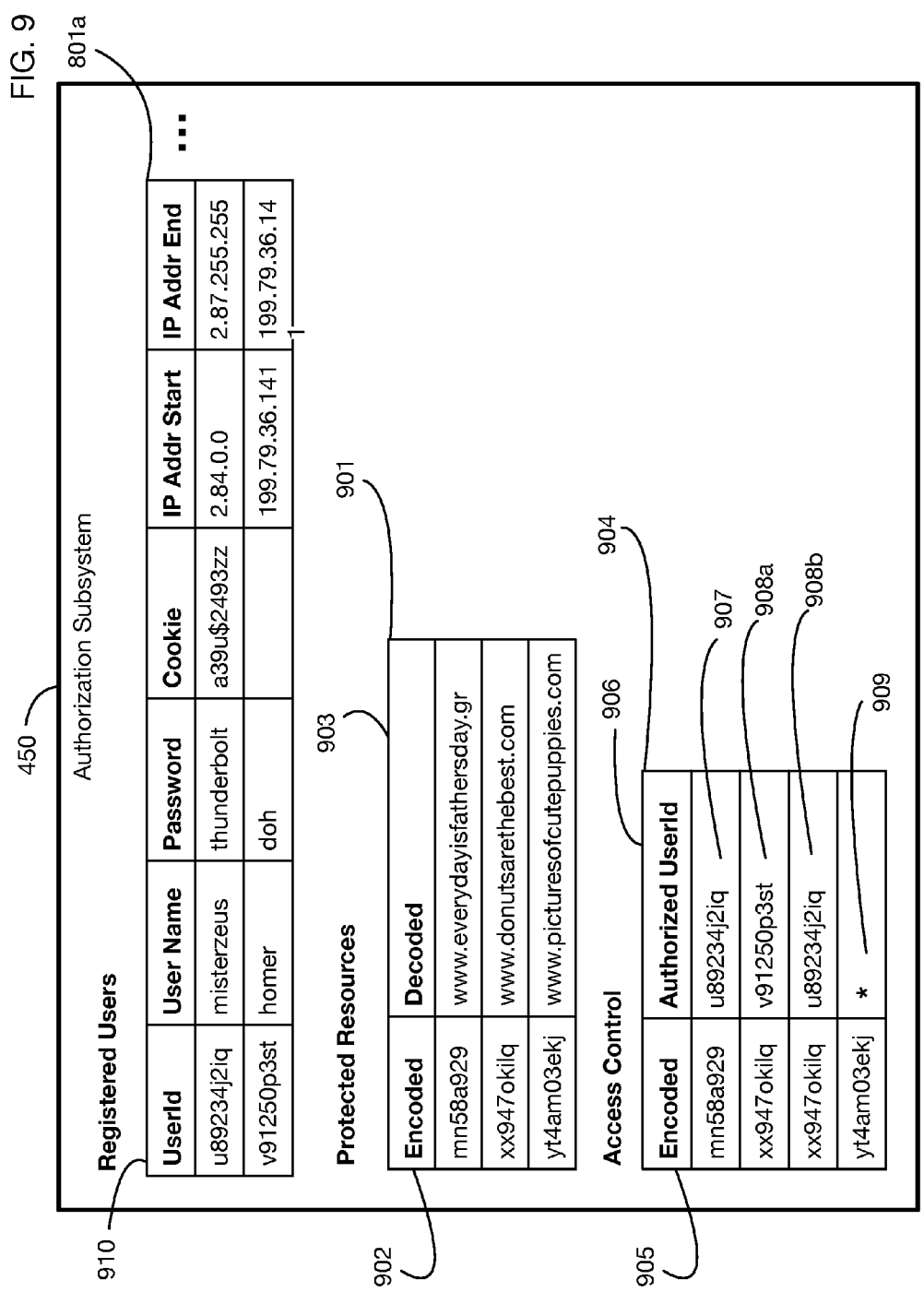
FIG. 9 illustrates an embodiment of an Authorization Subsystem that extends the user credentials illustrated in FIG. 8 to include access control lists for individual resources.

In one or more embodiments of the system, a user may require authorization for a specific resource (in addition to authorization for the system overall) in order to access the resource. FIG. 9 illustrates an embodiment that incorporates resource-specific access control into the Authorization Subsystem 450. In addition to the Registered Users table 801a that contains user credentials, this embodiment includes a Protected Resources table 901 that describes the protected resources, and an Access Control table 904 that indicates which users may access which protected resources. The Registered Users table 801a contains an additional column 910 with a unique ID for the user. The Protected Resources table 901 maps the Encoded links in column 902 into the corresponding Decoded links in column 903. The Access Control table 904 is a one-to-many table mapping the Encoded links in column 905 into the Authorized User Id 906 that may be for example a foreign key to the Registered users table 801a corresponding to column 910. This one-to-many mapping provides fine-grained access control that can grant or deny access of any user to any resource. For example, encoded link mn58a929 appears only in row 907, indicating that it may be accessed only by user u89234j2iq. Encoded link xx947okilq appears in rows 908a and 908b, indicated that users v91250p3st and u89234j2iq can both access the resource. Row 909 shows a "*" for the Authorized User Id associated with encoded link yt4am03ekj; this may indicate for example that all users authorized by the system may access this resource. One or more embodiments may use more complex access control lists that indicate for example specific permissions associated with each user and resource combination. For example, some users may have read-only access to a resource, while other users may have read and write access to a resource. In one or more embodiments an Access Control table may for example define access rules for groups of users in addition to or instead of individual users. In one or more embodiments an Access Control table may contain negative permissions that prevent specified users or groups from accessing specific resources or from performing particular actions. In one or more embodiments, use of the encoded resource reference 902 as the key to the Access Control table may provide an optimization since access authority for a user can be checked prior to decoding a link. In one or more embodiments Access Control tables or other access authorization mechanisms may use the decoded references rather than the encoded references, and decoding may be needed prior to checking authorization.

Figure 10:
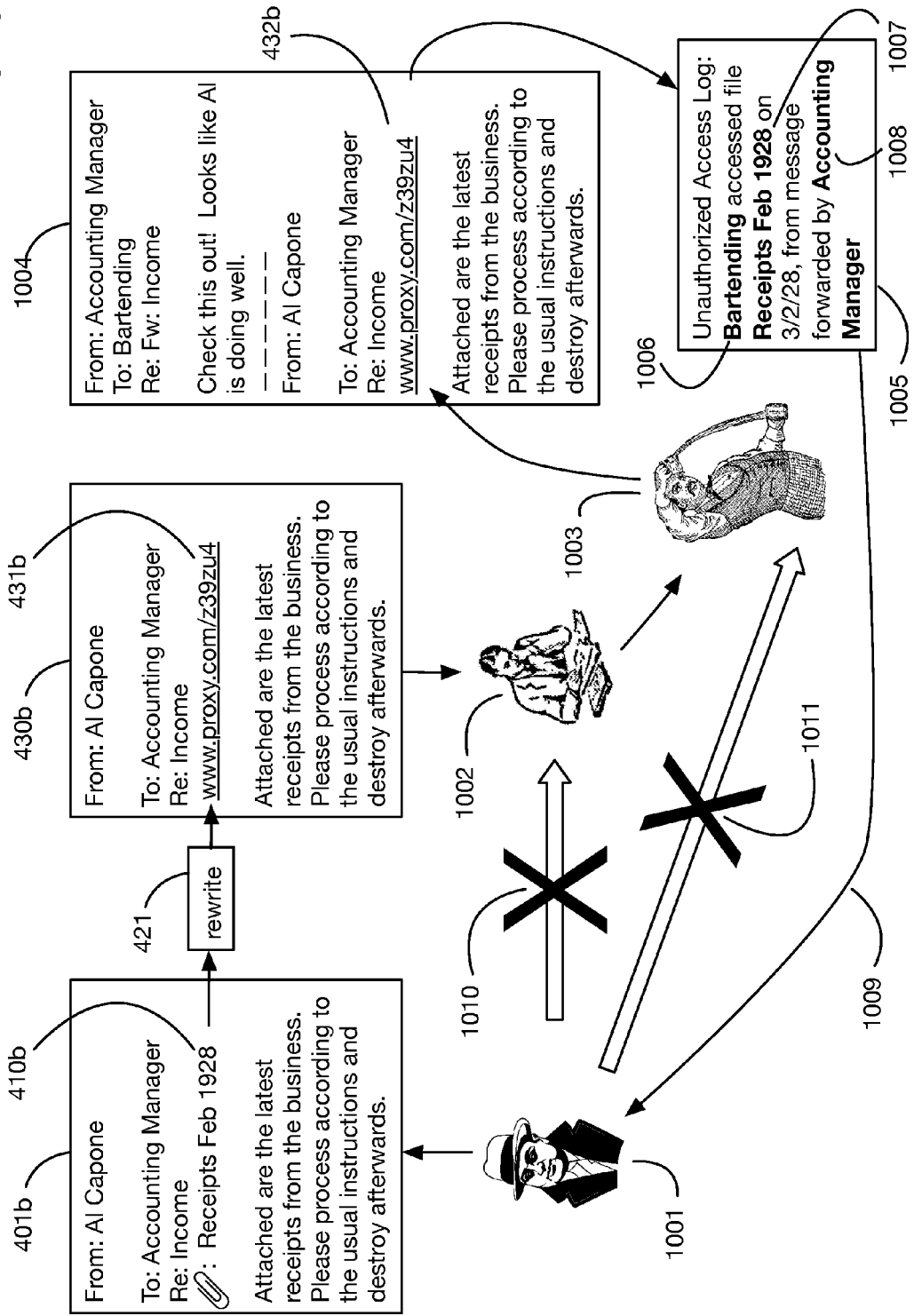
FIG. 10 illustrates an embodiment of the invention that provides access security for an email attachment, by logging unauthorized access attempts.

In one or more embodiments, the resources protected by the system may include message attachments. These attachments may include for example any kind of file or media, or any other item that can be attached to or included with an electronic message. FIG. 10 illustrates an example with message 401b from sender 1001 containing an attached file 410b. The system performs rewrite operation 421 on the attachment 410b and converts it to a protected reference 431b in protected message 430b. The protected message 430b is then delivered to the recipient 1002. Recipient 1002 makes a copy of the protected reference by forwarding the message 430b to another user 1003 as forwarded message 1004 with copy of the protected reference 432b. User 1003 then attempts to access the resource through this copy 432b of the protected reference to the resource. This example presumes that only recipient 1002 and sender 1001 are authorized users for the resource as defined for example in an access control list for the resource. User 1003 is an unauthorized user, and the system therefore blocks access, as described above. FIG. 10 also illustrates an additional feature of one or more embodiments wherein unauthorized access attempts may be logged with detailed information about the access attempt. The system generates Unauthorized Access Log entry 1005, which in this illustrative example describes the user attempting access 1006, the resource the user attempted to access 1007, and the source of the copy 1008. One or more embodiments may include any available information in an unauthorized access log entry, in order for example for senders or administrators to monitor communication paths, identify channels that may leak protected information, and monitor compliance with policies for secure information. In this example the Unauthorized Access Log 1005 is sent on path 1009 to sender 1001, who may then take corrective actions 1010 and 1011. In one or more embodiments access logs and notices of attempted unauthorized access may be sent immediately or periodically for example to senders, recipients, system administrators, security personnel, or any other relevant parties.

Figure 11:
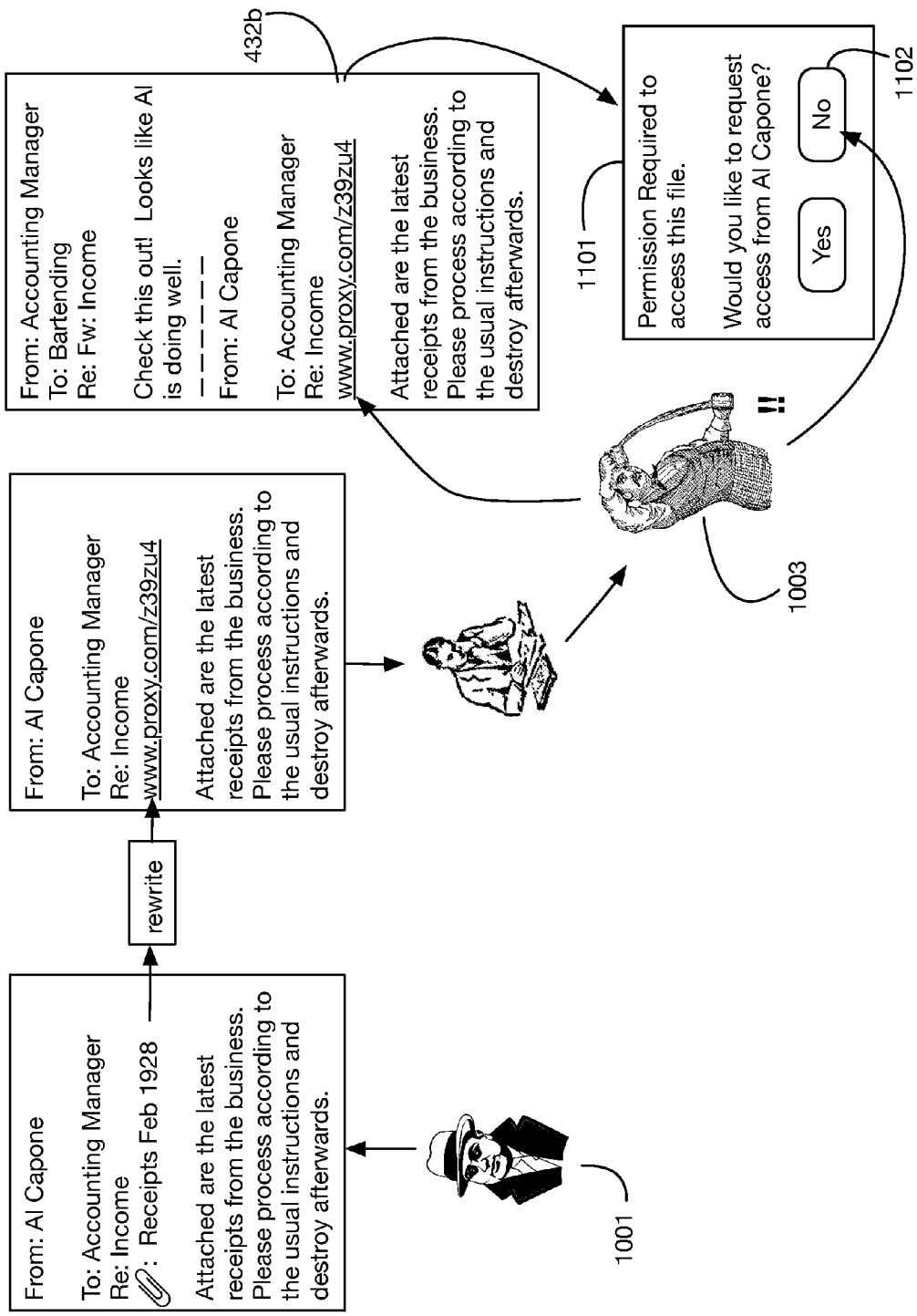
FIG. 11 illustrates a variation of the embodiment of FIG. 10 that asks an unauthorized user attempting to access a resource if he wishes to request permission to access the resource.

FIG. 11 illustrates an embodiment that is a variation of the example shown in FIG. 10. In this example, an attempt by unauthorized user 1003 to view protected resource reference 432b triggers a prompt 1101 to user 1003 informing him that permission is required to access the file, and asking him if he wants to request permission, in this case from the sender 1001. The user 1003 chooses the No option 1102 to indicate that he does not want to request permission. One or more embodiments may apply any desired policy to manage attempts by unauthorized users to access protected resource references. These policies may include for example, without limitation, blocking access, logging the access attempt (as illustrated in FIG. 10), informing the user that the resource is unavailable, asking the user if he or she wants to request permission to access the resource (as illustrated in FIG. 11), providing limited or restricted access, or any combination of these policies.

Figure 12:
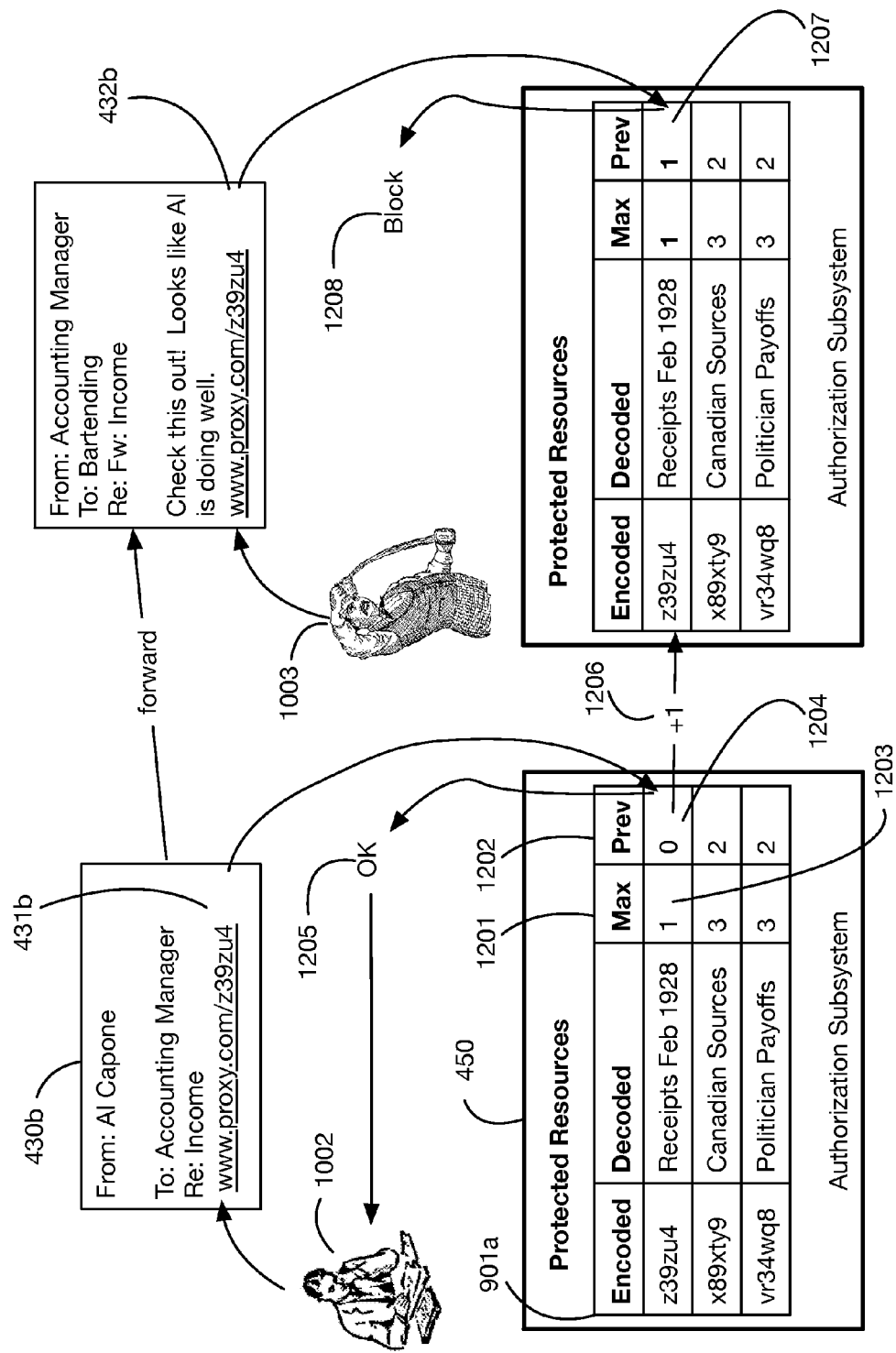
FIG. 12 illustrates an embodiment of an Authorization Subsystem that limits resource access by setting a maximum number of times a resource may be accessed.

One or more embodiments may limit access to protected resources by limiting the number of times a protected resource reference may be used. FIG. 12 illustrates an example of an embodiment that includes a maximum count 1201 for resource reference usage in the Protected Resources table 901a of the Authorization Subsystem 450. The table also tracks the number of previous accesses 1202 for each protected resource reference. In this illustrative example, protected message 430b contains an encoded reference 431b to a resource (here a file attachment), and the maximum number of accesses 1203 allowed for this resource is 1. Thus any attempts after the initial access to view this resource will be blocked. When recipient 1002 receives the message 430b and initially accesses the protected reference 431b, the previous access count 1204 is zero. Because this previous access count 1204 is lower than the maximum count 1203, access is permitted 1205. The Authorization Subsystem increments 1206 the previous access count to 1207 to reflect this access. If recipient 1002 then forwards the message to user 1003, generating copy 432b of the protected reference, an attempt by user 1003 to access 432b will be blocked 1208 since the resource has already been accessed for the maximum number of times. Similarly, one or more embodiments may limit the amount of time that a resource may be accessed. For example, the Authorization Subsystem may have a protected resource reference expiration date, after which no accesses of this protected resource are permitted. One or more embodiments may limit the total duration of access, for example if the time of access can be monitored by the system. One or more embodiments may combine maximum resource access counts or times with other authorization control mechanisms included those described above.

One or more embodiments may limit the number of users that are allowed to access a resource, instead of or in addition to limiting the total number of accesses or the total time available for access. FIG. 12A illustrates an embodiment that uses this technique to determine if users are authorized to access resources. Protected Resources table 901b has column 12A01 for the maximum users count for a resource; this count is the maximum number of distinct users that may access a resource before further access is blocked. Column 12A02 is an accessed-by list for each resource; this column tracks the identities of users who have previously accessed each resource. In this illustrative example arbitrary 3-character user identifiers are used to show user identities; one or more embodiments may use any user identifier to track which users have accessed which resources. User 1002 with illustrative user identifier 12A03 attempts to access protected link 431b in message 430b. This access attempt triggers a check of the Protected Resources table 901b. The accessed-by list 12A04 for this protected resource reference is empty, and the maximum user count 12A05 is 1; thus an additional access is allowed and the system allows access 12A06. This successful access causes the user's identity 12A03 to be added 12A07 to the accessed-by column, resulting in a new accessed-by list 12A08 for this resource. User 1002 then forwards the message to user 1003 with user identifier 12A09. User 1003 attempts to access the copy 432*b* of the protected resource reference. This triggers another check of the Protected Resources table. Now the number of users in the accessed-by column 12A08 for the resource is 1, which matches the maximum 12A05. Therefore the access attempt is blocked 12A10. However if the initial user 1002 attempts to access the resource again with access attempt 12A11, the authorization check determines that the user's identity 12A03 is already in the accessed-by list 12A08 for the resource, so the subsequent access is permitted 12A12.

One or more embodiments may provide secure access to resources via a sandbox environment. The sandbox environment may for example allow users to open, view, manipulate, or execute resources in an environment that limits the effect of potential threats, or that limits users' ability to perform selected actions. Sandbox environments may for example include virtual machines, specialized applications, specialized electronic message clients, or managed cloud applications. FIG. 13 illustrates an embodiment that uses a managed cloud application to provide secure access to resources. When user 1002 accesses protected resource reference 431*b*, which here refers to an email attachment, the system provides access to a copy 1302 of the original attachment that is stored in a cloud-based file system 1301. A copy of the original attachment is never downloaded to the user's computer. The system opens the file using a managed cloud application (here a spreadsheet viewer 1305) that executes on a remote server 1304; the user views the file through his browser 1310. The managed cloud application 1305 and cloud-based file system 1301 provide a sandbox environment that limits the impact of potential threats on the user's computer (and on other systems connected to this computer). For example, a virus check 1303 may be performed automatically when opening the file 1302. Because the cloud-based system is managed, virus checking and other security features may be more complete and more up to date than the security capabilities of the user's local computer. For example, a cloud-based system may have the latest security patches and virus definitions, whereas a user may forget or choose not to install these. In addition, the effect of any threats embedded in the file are limited since the browser environment itself provides a sandbox. Moreover, the cloud application may be configured to limit the user's permissions for the resource. In this example, the Copy button 1306 and Print button 1307 of the managed spreadsheet application 1305 are greyed out, indicating that they are disabled for the user. Disabling these or similar features may for example limit leaks of sensitive information contained in the file. One or more embodiments may use any sandbox environment for access to protected resources, including but not limited to managed cloud environments such for example as Google™ Docs, Microsoft Office™ Online, or Dropbox™. One or more embodiments may configure a sandbox environment to associate any applications with any types of files. One or more embodiments may perform any desired security checking actions, such as for example virus checking, prior to opening a file or accessing a resource in a sandbox environment. One or more embodiments may provide any desired limitations on application features and permissions within a sandbox environment.

While the invention herein disclosed has been described by means of specific embodiments and applications thereof, numerous modifications and variations could be made thereto by those skilled in the art without departing from the scope of the invention set forth in the claims.

What is claimed is:

1. An electronic message threat protection system for authorized users comprising:
    a message transformation subsystem comprising
        a message input module that receives an electronic message comprising
            a sender information;
            a recipient information; and,
            a resource or a reference to said resource, wherein said resource or said reference to said resource comprises one or more of a link to a web page and a message attachment that comprises an attached file;
        a reference rewriting module that replaces said resource or said reference to said resource with a protected reference to said resource, to form a protected message;
            wherein said protected reference comprises one or more of
                an encoded link to said web page comprising the link to said web page with an encoded path, and
                a converted protected attachment comprising an encoded file reference; and,
        a message output module that forwards said protected message to a recipient corresponding with said recipient information;
    an authorization subsystem configured to determine whether a user is an authorized user who is permitted to use said protected reference to access said resource; and,
    a secure resource access subsystem configured to provide said authorized user with secure access to said resource via a security mechanism that mitigates one or more potential threats from said resource;
    wherein the message input module, the reference rewriting module and the security mechanism are executable on a client or server computer or set of client or server computers;
    wherein
        said recipient of said electronic message creates a copy of said protected reference;
        use of said protected reference or of said copy of said protected reference by said user to access said resource automatically causes
            said authorization subsystem to determine whether said user is said authorized user; and,
            when said user is said authorized user, said secure resource access subsystem to provide said authorized user with said secure access to said resource via said security mechanism; and,
            when said user is not said authorized user, said secure resource access subsystem to block access to said resource for said user; and,
    wherein
        said secure resource access subsystem comprises a sandbox environment configured to open a sandboxed file;

said protected reference comprises
  a proxy server address of a proxy server;
    said encoded file reference to said sandboxed file, wherein said sandboxed file is a copy of said attached file in said sandbox environment;
  said proxy server comprises or communicates with
    said authorization subsystem;
    said secure resource access subsystem; and,
  said proxy server is configured to
    decode said encoded file reference to obtain a reference to said sandboxed file; and,
    open said sandboxed file in said sandbox environment.

2. The system of claim 1, further comprising
a proxy server that comprises or communicates with
  said authorization subsystem; and,
  said secure resource access subsystem;
wherein
  said web page has a web page identity;
  said protected reference further comprises
    said proxy server address of said proxy server; and,
  said proxy server is configured to decode said encoded link to obtain said link to said web page.

3. The system of claim 2, wherein said provide said authorized user with said secure access to said resource via a security mechanism comprises
  check said web page for potential threats;
  when said check said web page indicates that said web page is a known or suspected malicious web page,
    block access to said web page; or
    warn said authorized user about said web page; or
    both block access to said web page and warn said authorized user about said web page; and,
  when said check said web page does not indicate that said web page is a known or suspected malicious web page,
    provide said authorized user with access to said web page via said link to said web page.

4. The system of claim 3, wherein
said secure resource access subsystem comprises
  a whitelist of identities of web pages presumed to be secure;
  a blacklist of identities of web pages presumed to be malicious; and,
  a policy for unknown web page identities comprising at least one of
    block unknown web pages;
    allow unknown web pages; and,
    warn user of unknown web pages; and,
said provide said authorized user with secure access to said resource via a security mechanism comprises
  provide access to said web page when said web page identity is in said whitelist;
  block access to said web page when said web page identity is in said blacklist; and,
  when said web page identity is not in said whitelist and is not in said blacklist, apply said policy for unknown web page identities.

5. The system of claim 3, wherein
said check said web page indicates that said web page is a known or suspected malicious web page comprises
  said web page identity is similar to but not identical to an identity of a known or presumed legitimate web page.

6. The system of claim 1, wherein
said authorization subsystem comprises a database comprising
  registered users; and
  registered user credentials for each of said registered users; and,
said determine whether a user is an authorized user comprises
  obtain user credentials from said user; and,
  determine that said user is an authorized user when and only when said user credentials match said registered user credentials for a registered user in said database.

7. The system of claim 6, wherein said registered user credentials comprise one or more of
  an Internet protocol (IP) address or IP address range;
  a password;
  a PIN;
  a one-time PIN or one-time password sent to said user;
  a biometric credential;
  a security token;
  a security certificate;
  a response to a challenge question;
  single sign-on credentials from a single sign-on service; and,
  cached valid credentials previously provided by said user and stored on a memory associated with said user.

8. The system of claim 6, wherein
said database further comprises
  an access control list for said resource that describes which of said registered users may access said resource; and,
said determine whether a user is an authorized user further comprises
  determine whether said user is authorized by said access control list to access said resource.

9. The system of claim 8, wherein said access control list for said resource comprises only a sender corresponding with said sender information and a recipient corresponding with said recipient information.

10. The system of claim 1, wherein said determine whether a user is an authorized user further comprises
  when said user is not said authorized user, create a log entry describing an unauthorized access attempt for said resource.

11. The system of claim 10, wherein said log entry is sent automatically to one or more of
  a system administrator,
  a sender corresponding with said sender information, or
  a recipient corresponding with said recipient information.

12. The system of claim 8, wherein said determine whether a user is an authorized user further comprises
  when said user is not said authorized user, said user is requested to make a determination as to generating a request for access to said resource or not generating a request for access to said resource; and,
  when said user determines to generate said request for access to said resource, forward said request for access to said resource to one or more of
    a system administrator,
    a sender corresponding with said sender information, or
    a recipient corresponding with said recipient information.

13. The system of claim 1, wherein
said authorization subsystem comprises
  a maximum access count for said resource; and,
  a previous access count for said resource; and, said determine whether a user is an authorized user comprises
　when said previous access count is less than said maximum access count,
　　determine that said user is said authorized user, and increment said previous access count by one; and,
　when said previous access count is greater than or equal to than said maximum access count,
　　determine that said user is not said authorized user.

14. The system of claim 1, wherein
said authorization subsystem comprises
　a maximum users count for said resource; and,
　an accessed-by list for said resource comprising a list of users that have successfully accessed said resource, wherein said accessed-by list is initially empty prior to any access attempts for said resource; and,
said determine whether a user is an authorized user comprises
　when said user is in said accessed-by list,
　　determine that said user is said authorized user;
　when said user is not in said accessed-by list,
　　when a number of users in said accessed-by list is less than said maximum users count,
　　　determine that said user is said authorized user, and
　　　add said user to said accessed-by list for said resource; and,
　　when said number of users in said accessed-by list is greater than or equal to than said maximum users count,
　　　determine that said user is not said authorized user.

15. The system of claim 1, wherein said sandbox environment comprises a managed cloud application.

16. The system of claim 1, where said electronic message comprises one of said resource or one of said reference to said resource.

17. An electronic message threat protection system for authorized users comprising
　a proxy server;
　a message transformation subsystem comprising
　　a message input module that receives an electronic message comprising
　　　a sender information;
　　　a recipient information; and,
　　　a reference to a resource comprising a link to a web page;
　　　wherein said web page has a web page identity;
　　a reference rewriting module that replaces said reference to a resource with a protected reference to said resource, to form a protected message, wherein said protected reference to said resource comprises
　　　a proxy server address of said proxy server; and,
　　　an encoded link to said web page; and,
　　a message output module that forwards said protected message to a recipient corresponding with said recipient information;
　an authorization subsystem comprising a database comprising
　　registered users; and
　　registered user credentials for each of said registered users;
　　wherein said registered user credentials comprise one or more of
　　　an Internet protocol (IP) address or IP address range;
　　　a password;
　　　a PIN;
　　　a one-time PIN or one-time password sent to said user;
　　　a biometric credential;
　　　a security token;
　　　a security certificate;
　　　a response to a challenge questions;
　　　single sign-on credentials from a single sign-on service; and,
　　　cached valid credentials previously provided by said user and stored on a memory associated with said user; and,
　a secure resource access subsystem comprising
　　a whitelist of identities of web pages presumed to be secure;
　　a blacklist of identities of web pages presumed to be malicious; and,
　　a policy for unknown web page identities comprising at least one of
　　　block unknown web pages;
　　　allow unknown web pages; and,
　　　warn user of unknown web pages;
　wherein the message input module and the reference rewriting module are executable on a client or server computer or set of client or server computers;
　wherein
　　said proxy server comprises or communicates with
　　　said authorization subsystem; and,
　　　said secure resource access subsystem;
　　said proxy server is configured to decode said encoded link to obtain said link to said web page;
　　said recipient of said electronic message creates a copy of said protected reference;
　　use of said protected reference or of said copy of said protected reference by said user to access said resource automatically causes
　　　said authorization subsystem to
　　　　obtain user credentials from said user; and,
　　　　determine that said user is an authorized user when and only when said user credentials match said registered user credentials for a registered user in said database;
　　　when said user is said authorized user, said secure resource access subsystem to
　　　　decode said encoded link to obtain said link to said web page;
　　　　provide access to said web page when said web page identity is in said whitelist;
　　　　block access to said web page when said web page identity is in said blacklist; and,
　　　　when said web page identity is not in said whitelist and is not in said blacklist, apply said policy for unknown web page identities; and,
　　　when said user is not said authorized user, said secure resource access subsystem to block access to said web page for said user; and,
　wherein
　　said secure resource access subsystem comprises a sandbox environment configured to open a sandboxed file;
　　said protected reference comprises
　　　said encoded file reference to said sandboxed file, wherein said sandboxed file is a copy of said attached file in said sandbox environment;
　　said proxy server comprises or communicates with
　　　said authorization subsystem;
　　　said secure resource access subsystem; and, said proxy server is configured to
  decode said encoded file reference to obtain a reference to said sandboxed file; and,
  open said sandboxed file in said sandbox environment.

18. The system of claim 17, where said electronic message comprises one of said resource or one of said reference to said resource.

* * * * *